Oct. 31, 1961 D. W. WHITE 3,006,544
SLIDE RULE
Filed Oct. 3, 1960
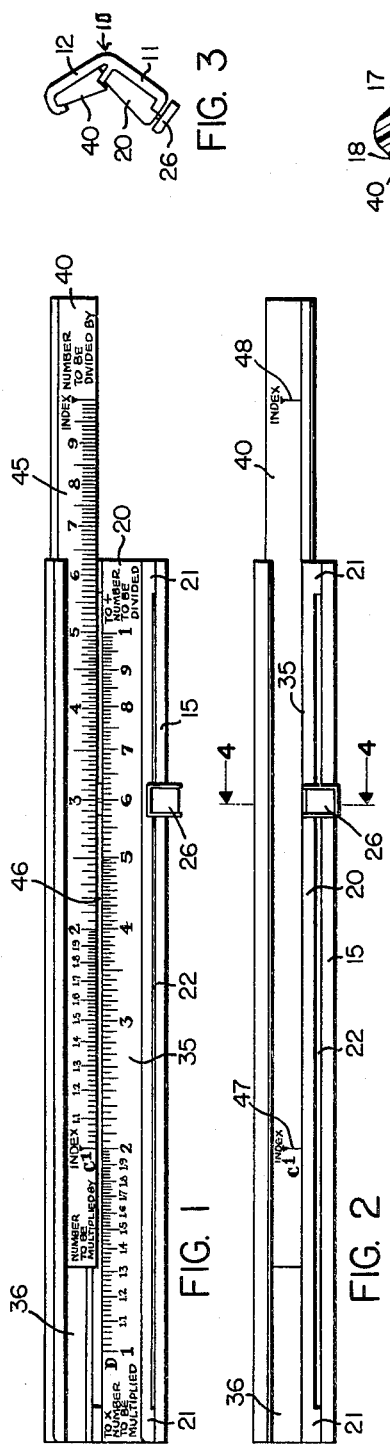
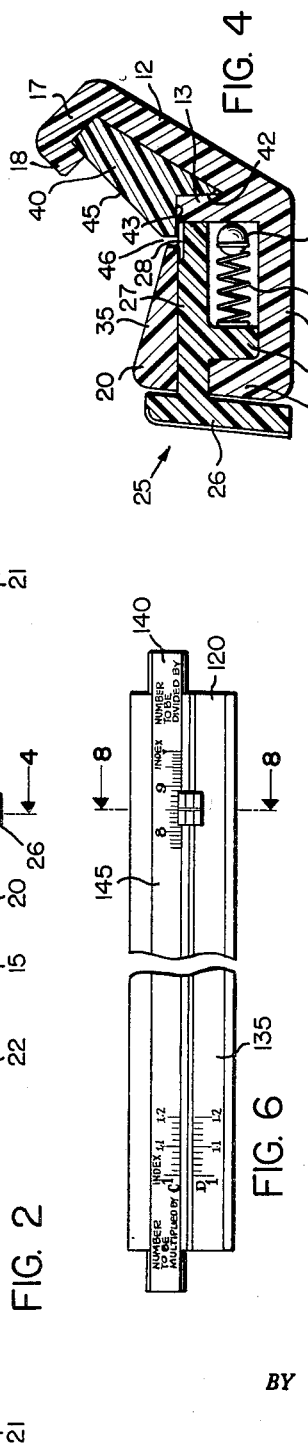
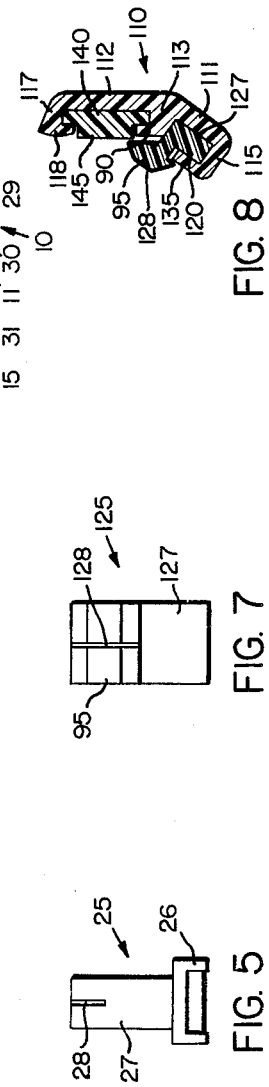
INVENTOR.
DONALD W. WHITE
BY
Attorney

United States Patent Office 3,006,544
Patented Oct. 31, 1961

3,006,544
SLIDE RULE
Donald W. White, 84 Brooklawn Drive,
Rochester 18, N.Y.
Filed Oct. 3, 1960, Ser. No. 59,983
9 Claims. (Cl. 235—70)

The present invention relates to improvements in slide rules.

Engineers have relied upon slide rules for years to make fast, accurate computations. One object of the invention is to bring to students and other persons, not engineers, the advantages of a slide rule by providing a simple, easy device for multiplying and dividing, using the slide rule principle.

Another object of the invention is to provide a simplifide slide rule, which can be used by school children, but which will also be practical for use by engineers, and which can be employed by them in a large proportion of their work.

Another object of the invention is to provide an improved slide rule which can be read more readily and more precisely than conventional slide rules.

Other objects of the invention will be apparent hereinafter from the specification from the recital of the appended claims.

In the drawings:

FIG. 1 is a front elevation of a slide rule made according to one embodiment of this invention;

FIG. 2 is a side elevation of this rule with the graduations removed for the sake of simplicity in illustration;

FIG. 3 is an end elevation of this rule;

FIG. 4 is a section on the line 4—4 of FIG. 2 looking in the direction of the arrows and on a considerably enlarged scale;

FIG. 5 is a plan view on a somewhat enlarged scale as compared with FIGS. 1 and 2 of the indicator employed with this scale;

FIG. 6 is a fragmentary side elevation of a scale built according to a modification of the invention;

FIG. 7 is a plan view of the indicator used with this modified form of scale; and FIG. 8 is a section on the line 8—8 of FIG. 6, looking in the direction of the arrows and on a somewhat enlarged scale.

The device of the present invention is designed to use the two C and D scales of the conventional slide rule, because most arithmetical problems can be handled by these two scales. Anyone, who has occasion to solve a simple or a complicated problem involving multiplication or division, can use the device of the present invention with advantage.

The device of the present invention is not a gadget or a toy, but rather a precise instrument with the same accuracy as the most expensive slide rule.

Referring first to the embodiment of the invention shown in FIGS. 1 to 5 inclusive, 10 (FIG. 4) denotes the base or frame of the slide rule. This base has two portions denoted at 11 and 12, respectively, which are separated by a partition wall 13, and which are inclined to one another. The portion 11 is bounded on opposite longitudinal edges by the outside wall 15 of the base and the partition 13, and thus is channel-shaped. The portion 12 of the base is bounded by the partition 13 and the other outside wall 17 of the base, and thus is also channel-shaped.

Mounted above the portion 11 of the base and fixedly secured thereto is a plate 20. In the embodiment shown, this plate has foot portions 21 (FIGS. 1 and 2) at its opposite ends which are cemented or otherwise fixedly secured to the upper face of the outside wall 15 of the base; and between its foot portions 21, the bottom surface of the plate 20 is parallel to but spaced from the upper face of the wall 15, so that there is a slot 22 formed between the bottom face of the plate 20 and the upper face of the wall 15.

An indicator 25 (FIGS. 4 and 5) is mounted to slide in the slot 22. This indicator has a hand-grip portion 26 by means of which it may be grasped to slide it in the slot 22. It has a portion 27 projecting laterally from the gripping portion 26 and extending through the slot 22 beneath the plate 20 and beyond the inner lateral edge of the plate 20. This laterally extending portion 27 is recessed on its upper face at its inner lateral end, as denoted at 28. The recess 28 may be colored a different color from the main portion of the laterally extending part 27 so as to make it readily visible.

The indicator is adapted to be held by friction resiliently in any position to which it is adjusted by means of a spring-pressed ball 29 which operates as a detent and which is constantly pressed into engagement with one side of the partition 13 by a coil spring 30 which is interposed between the ball and the opposed side face of a downwardly-depending portion 31 of the indicator. For rigidity, the opposite side face of the depending portion 31 slides on the opposed inside face of the wall 15 of the base.

The upper face 35 of the plate 20 is graduated, and is inclined to the horizontal as shown in FIG. 4.

Mounted to slide in the channel 36 formed in the portion 12 of the base is a slidable member 40, whose upper face 45 is graduated to form the slidable scale of the slide rule. The plate 40 is of generally wedge-shape in cross-section, as shown in FIG. 4. Its side, adjacent the fixed scale 35, is formed with a V-notch, one leg 42 of which seats against the adjacent side wall of the partition 13, and the other leg 43 of which seats on the top of this partition wall 13. The construction is such that the graduated upper face 45 of the scale member 40 is inclined to the graduated upper face 35 of the fixed scale member 20. The inclination of one scale with reference to the other makes it easier to read their graduations accurately. To further facilitate reading of the slide rule, the graduations on the two scales are preferably differently colored. Those on one scale, scale 45, for instance, may be colored red, and those on the other scale, scale 35, for example, may be colored a contrasting color such as black. The red C scale 45 and the black D scale 35 are, however, otherwise identical. The adjacent lateral sides of the two scales are spaced apart sufficiently, as shown in FIG. 4, so that the colored recessed portion 28 of the indicator 25 is visible in the slot formed by the opposed side faces of the two scales.

The sliding member 40 is readily slidable in its channel 36 during use of the scale. It is retained in the channel by the overhanging portion 18 of the side wall 17 of the base.

In the embodiments of the invention shown, the scales 35 and 45 are graduated to permit multiplication or division. It is possible to multiply or divide any number from fractions to billions on this scale. Depending on the problem, the numerals 1, 2, 3, etc. on the scales can be assigned a value of 10, 20, 30, 10 million, 20 million, 30 million, or 10, 20, or 30 thousand, etc. The only point to be remembered about using the scales is as to the location of the decimal point when multiplying or dividing. The markings or graduations between 1 and 2 may designate 1.1, 1.2, 1.3, etc., or may be considered as denoting 11, 12, 13, or 110, 120, 130, etc.

Using the device of the present invention, it is possible readily to get an answer to a problem involving a sequence of multiplications and divisions. For example, this slide rule can be used in solving a problem such as:

$$9 \times 12 \times 3 \div 2 = 162$$

To use the device in multiplying, for example to multiply 2 by 3, the slidable C scale 45 is moved until the index line 47 at the left of this scale appears over the number to be multiplied, namely, 2, on the black D scale. Then move the indicator 25 to the number that is the multiplier, namely, 3, on the red C scale 45. The product or answer, 6, is read on the black D scale 35 opposite the red 3 at the indicator 25.

To divide, for example to udivide 6 by 2, move the indicator 25 to the number to be divided, namely, 6, on the black D scale 35. Then slide the red C scale 45 until the divisor, the red 2, is aligned with the indicator 25. Then, without moving the red C scale 45, slide the indicator 25 until it registers with the nearest index, 47 or 48, of the C scale 45. The quotient or answer, namely, 3, is read on the black D scale 35 which appears opposite the colored recess 28 on the indicator.

In the modification of the invention illustrated in FIGS. 6, 7 and 8, the base 110 has, as before, two portions 111 and 112 which are inclined to one another, and which are channel-shaped. The outside wall 115 of the base portion 111 is, however, in this embodiment formed with an overhanging portion 120, which is integral with an, therefore, fixed to the base portion, and whose upper face 135 is graduated for the black D scale. The wall 117 of the base portion 112 has, as in the first-described embodiment of the invention, an overhanging portion 118. The partition 113 between the two base portions is, in this embodiment, formed also with an overhanging portion 90; and the two overhanging portions 90 and 118 serve to retain the slidable scale member 140 in the channel formed in the base portion 112. The slidable member 140 is graduated on its upper face 145, similar to the graduations of the upper face 45 of the slidable member 40 of the scale of the first-described embodiment of the invention.

One primary difference between the two illustrated embodiments of the invention is the indicator. In the case of the scale shown in FIGS. 6, 7, and 8, this indicator has a base portion 127 which slides in the channel formed in the base portion 111 and is retained by the overhanging portion 120 of the scale. The indicator has an upwardly projecting portion at one side, the side adjacent the partition 113, which engages the adjacent side wall of the partition to guide the indicator; and the indicator is formed above the overhanging portion 120 and above the partition wall 113 with a head 95, which has a flat top and two diverging downwardly-inclined portions extending to closely adjacent the scales 135 and 145. The head has a groove 128 in it, which may be colored for easy reading. This groove constitutes a marker whereby the scales may be read. Only part of the two scales 135 and 145 is shown in FIG. 6; but it will be understood that full scales, such as shown in FIG. 1, are employed in this embodiment of the invention also.

Preferably in both embodiments of the invention, the devices are made of a suitable plastic. However, they may be made of aluminum, or other suitable light-weight material.

The devices illustrated are based upon a scale 6½ inches long. This is a size suitable for carrying around in a pocket. It will be understood, however, that the device can be made of any length.

On the conventional slide rule, a plastic or glass indicator is used having a hairline extending across it. This is necessary because the several scales of a conventional slide rule have a predetermined relation to one another and the hairline indicator must be read against all of these scales.

With the device of the present invention a hairline indicator is not necessary, and instead what has been done is to leave a gap or space between the sliding C scale and the fixed D scale, and the indicator has been designed to move in this gap and serve the same purpose as the hairline on the conventional slide rule.

While the most popular use by far of the invention is likely to be for multiplication and division, it will be understood that instead of making the scales with graduations for this purpose, they may be graduated to suit other specific purposes, such as for computation of interest, use in determining fire control information in military installations, and various other applications.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A slide rule comprising a base, a first scale fixed to said base and graduated on its readable face, a second scale slidable on said base longitudinally of the first scale and also graduated on its readable face, the readable faces of the two scales being inclined to one another at a wide obtuse angle, the two scales being spaced laterally from one another along their adjacent longitudinal edges, and an indicator slidable longitudinally relative to both scales and having an indicating portion disposed in the space between the two scales.

2. A slide rule as claimed in claim 1 wherein the graduations of the two scales are of contrasting colors.

3. A slide rule comprising a base formed with two longitudinally-extending channel portions, a scale fixed to said base to overlie one of said channel portions, a scale slidable longitudinally in the other channel portion, both scales being graduated on their readable faces and having their adjacent longitudinal edges spaced laterally from one another, and an indicator slidable in said one channel portion and having an indicating mark disposed in the space between the two scales to be read against both.

4. A slide rule as claimed in claim 3, wherein the readable graduated faces of the two scales are inclined to one another at a wide obtuse angle.

5. A slide rule as claimed in claim 4 wherein the graduations of the two scales are of contrasting colors.

6. A slide rule comprising a base having a longitudinal slot along one side and having a portion fixed to the base which overlies said slot and which is graduated longitudinally on its readable face to form a first scale, a slide mounted on said base to slide thereon longitudinally of said first scale, said slide being graduated longitudinally on its readable face to form a second scale, said scales having their adjacent longitudinal edges spaced laterally from one another, and an indicator slidable longitudinally in said slot and having an indicating mark extending into the space between the scales and readable against the graduations of both scales.

7. A slide rule according to claim 6, wherein the graduated readable faces of the two scales are inclined to one another at a wide obtuse angle.

8. A slide rule comprising a base having two spaced, parallel, longitudinally-extending channels, a scale secured to said base to overlie one of said channels, said scale having its graduations on its readable face, a scale slidable longitudinally in the other channel and having graduations on its readable face, said scales having their adjacent longitudinal edges spaced laterally from one another, and an indicator slidable longitudinally in said one channel and extending into the space between said adjacent longitudinal edges and having indicating marks readable against the graduations of both scales.

9. A slide rule as claimed in claim 8, wherein the readable graduated faces of the two scales are inclined to one another at a wide obtuse angle.

References Cited in the file of this patent

UNITED STATES PATENTS

| | | |
|---|---|---|
| 543,612 | Colby | July 30, 1895 |
| 767,170 | Rosenthal | Aug. 9, 1904 |

Dedication 3,006,544.—*Donald W. White*, Rochester, N.Y. SLIDE RULE. Patent dated Oct. 31, 1961. Dedication filed Oct. 30, 1963, by the inventor.
  Hereby dedicates to the public the entire remaining term of said patent.
  [*Official Gazette January 7, 1964.*]